Oct. 31, 1950 R. BARKSTROM 2,527,786
ENDLESS CHAIN GATHERER FOR CORN HARVESTERS
Filed Dec. 29, 1948 2 Sheets-Sheet 2

INVENTOR.
Reynold Barkstrom
BY Paul O. Pippel
Atty.

Patented Oct. 31, 1950

2,527,786

UNITED STATES PATENT OFFICE 2,527,786

ENDLESS CHAIN GATHERER FOR CORN HARVESTERS

Reynold Barkstrom, Moline, Ill., assignor to International Harvester Company, a corporation of New Jersey Application December 29, 1948, Serial No. 67,930

1 Claim. (Cl. 56—66)

This invention relates to a new and improved cutoff corn picker.

There are two basic types of corn pickers. Perhaps the oldest type is that in which the stalk is left standing and the ear is snapped from the standing stalk for harvesting. The other type of corn picker involves the cutting of the stalk and thereafter a snapping or stripping of the ear from the cut stalk. Theoretically, there is a greater possibility in the cutoff type of picker to save corn, whether kernels or ears, which have a tendency to be lost during the snapping operation inasmuch as in the cut-off picker this job of snapping may be performed at a time when corn saving apparatus may be positioned thereb-eneath. In regular snapping pickers there can be no corn saving devices positioned between the snapping mechanism and the ground for the reason that the stalks are still held in the ground by their roots. In actual practice considerable difficulty has been encountered in making a successful cut-off type corn picker, whereas as above stated such a picker at least theoretically would be the most desirable.

It is therefore a principal object of this invention to provide a cut-off type corn picker in which the snapping methods of regular snapping pickers are simulated for the purpose of causing the device to be successful.

An important object of this invention is to provide a corn picker adapted to sever the stalks from the ground and thereafter grip the butt end of the severed stalk to simulate the holding of the butt end by root engagement with the ground and while the stalk is firmly held at its lower end the ear is snapped from the stalk.

Another important object of this invention is to provide means in a corn picker for cutting off the stalks and thereafter feeding the stalks upwardly and rearwardly into a snapping mechanism whereby corn previously lost during the snapping operation is now saved.

A further important object of this invention is to provide means for cutting stalks of corn and conveying the stalks rearwardly and upwardly and simultaneously to firmly grip the stalk at its lower end.

A still further important object of this invention is to provide a cut-off corn picker having means for snapping the ears from the stalks and further means for shredding the stripped stalks.

Other and further important objects of this invention will become apparent from the disclosures in the following specification and accompanying drawings.

Figure 1:
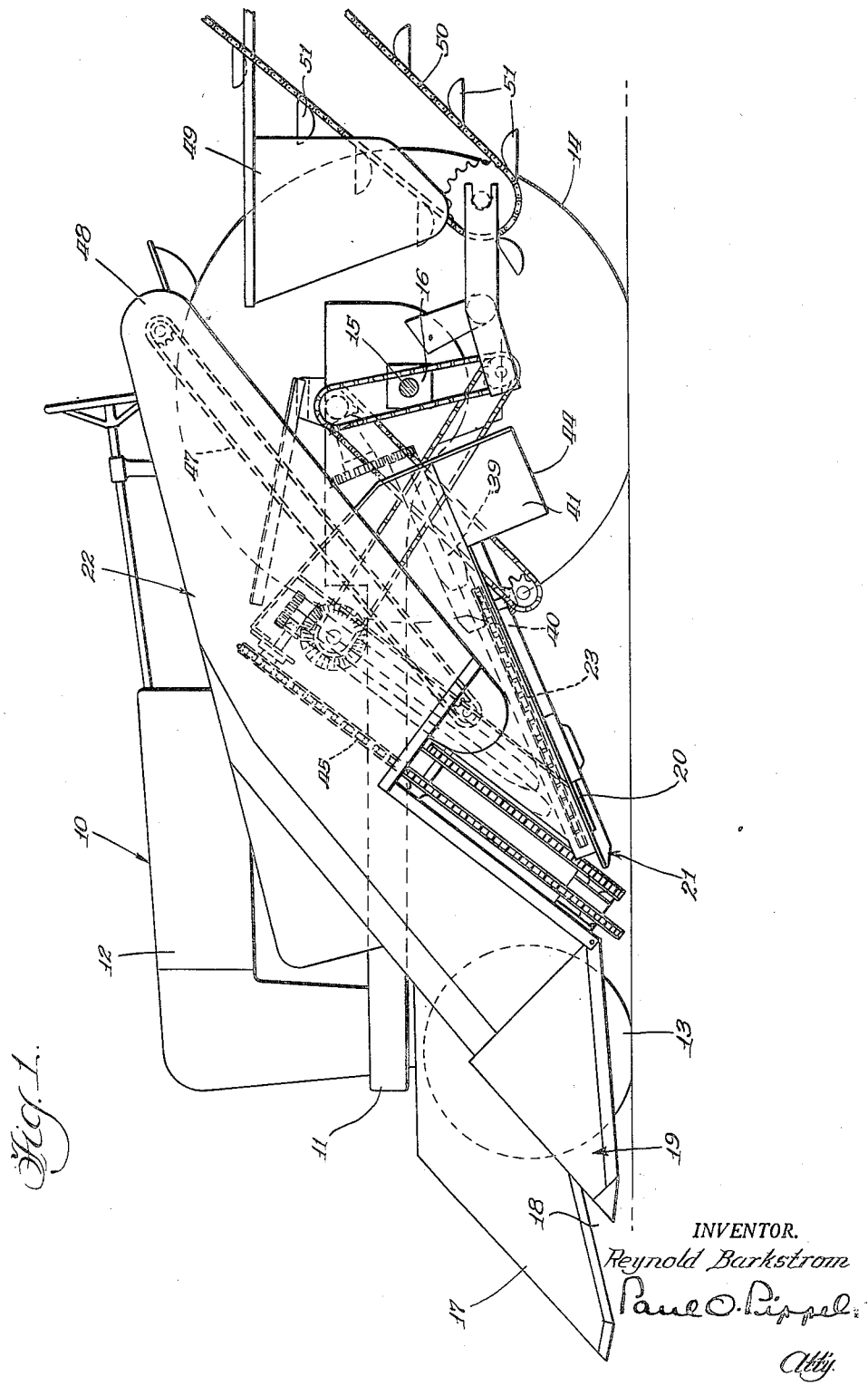
Fig. 1 is a side elevational view of the cut-off corn picker of this invention.

As shown in the drawings, the reference numeral 10 indicates generally an agricultural tricycle tractor having a relatively narrow longitudinally extending body portion or chassis 11, an engine 12, forwardly disposed dirigible wheels 13, and large rear traction wheels 14. The traction wheels 14 are relatively widely spaced and are mounted on and driven by axles 15 carried in an enlarged axle housing 16.

Figure 2:
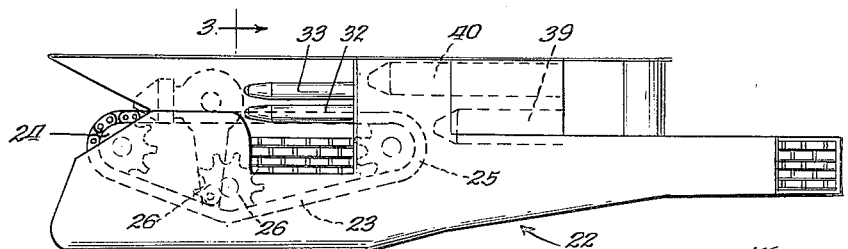
Fig. 2 is a top plan view on a smaller scale of the cut-off corn picker of this invention.

A center divider 17 is carried on the forward end of the tricycle tractor and is adapted to guide or otherwise direct stalks of corn into a throat 18 having its other side defined by a gathering point 19 spaced outwardly from the center divider 17. As the machine is driven down a row of standing stalks the stalks are guided into the throat 18 and are severed by means of a sickle 20 reciprocating across the throat at a lower portion thereof and at substantially the butt ends of the stalks. A butt pan 21 is carried on the supporting structure 22 of which the divider point 19 is a part. The butt pan extends from a relatively low forward position upwardly and rearwardly to a relatively high rearward position. A forwarding chain 23 is shown inclined to a position parallel to the butt pan and lying substantially on the butt pan. This forwarding chain is shown in greater detail in Figs. 2 and 3. Sprockets 24 and 25 maintain the spacing and positioning of the chain 23 along with an idler sprocket 26 for the purpose of adjusting the tension on the chain. A pressure plate 27 is arranged to exert a lateral force by means of a spring 28 confined against a wall 29 in the supporting structure 22.

Figure 3:
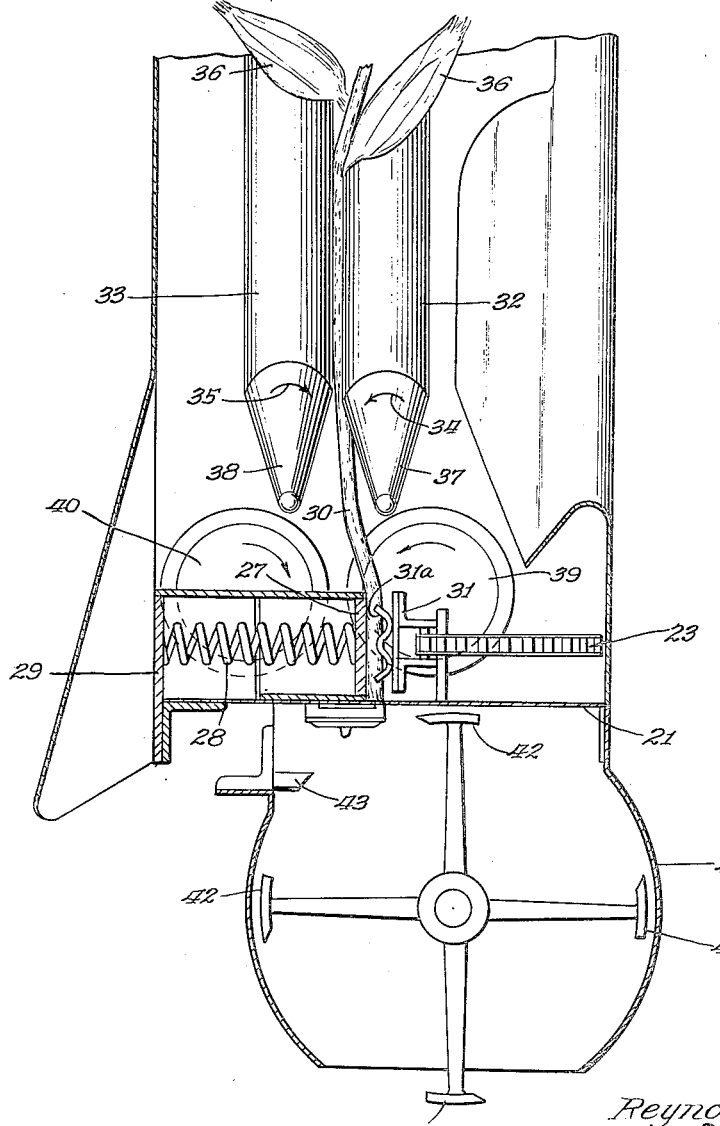
Fig. 3 is a sectional view taken on the line 3—3 of Fig. 2.

As best shown in Fig. 3, when a stalk 30 goes onto the butt pan 21, it is gripped by the flight members 31 on the forwarding chain 23 and is held against the forwarding chain by means of the spring pressed plates 27. The stalk 30 is now firmly gripped by corrugated faces 3/a on the flight members 31 at its butt end in a manner simulating the root attachment of a stalk in the ground. Cooperative snapping rolls 32 and 33 are journaled in the supporting structure 22 on an incline greater than the inclination of the butt pan and disposed above the butt pan. The inclination of the snapping rolls with respect to the butt pan is substantially the same as that angle between the snapping rolls of a non-cut-off picker and the ground. The cooperative snapping rolls are adapted to be rotated inwardly toward each other as indicated by the directional arrows 34 and 35. Thus, as the stalk travels up the butt pan 21 it is firmly gripped at its lower end and the distance between the snapping rolls and the butt pan increases by reason of the greater angular inclination of the snapping rolls. Ears of corn 36 on the rearwardly moving stalk approach the level of the snapping rolls and when the ears contact the rolls the ears are snapped or stripped from the stalk at a time when the butt end of the stalk is securely held. By this method of operation the stalks are fairly well controlled during the snapping operation and the tendency for the machine to fail to snap the ears or to lose a considerable amount of corn during the snapping operation is eliminated.

The snapping rolls 32 and 33 are of any conventional type having tapered forward points 37 and 38 to permit easy entrance of the stalks therebetween. The peripheral surfaces of the rolls is such that the stalks 30 will be pulled downwardly between the rolls and thus the ears 36 will be stripped from the stalks. However, the rolls are not excessively aggressive, thus insuring that the stalks will not buckle an undesirable amount between the butt pan and the rolls. It is a primary function of this machine to cause snapping of the ears of corn from their respective stalks by the gradual increasing of depth between the rolls and the butt pan as the stalks proceed rearwardly through the machine, thus making it possible for the rolls to engage the stalk at the level of the ear of corn without, as previously stated, forcing the stalk downwardly and causing it to buckle between the butt pan and the rolls. It is believed that this method of snapping the corn is more effective by reason of its smooth, easy action than the unnatural method of pulling the corn stalk through to cause a collapsing of the stalk.

When the stalk reaches a position relatively near the end of the butt pan 21 it leaves its engagement by the forwarding chain 23 and cooperative pressure plate 27 to be engaged by a pair of cooperative feed rolls 39 and 40. These rolls are arranged and constructed to simultaneously feed the stalks rearwardly and thence downwardly. As shown in Figs. 1 and 3 a housing 41 carries a stalk shredding mechanism. This mechanism is in the form of a longitudinally journalled rotary cutter or chopper 42 which is adapted to cut off increments of stalk as it is pulled down into the housing 41. The knives of the rotor cooperate with a shear plate or the like 43 to effect stalk chopping. The short lengths of stalk are then discharged through the opening 44 in the bottom of the housing 41, whereupon they drop back into the field. It would, of course, be possible to recover these shredded stalks. However, it is believed that dropping them back into the field provides for good soil mulch and thus the soil is thereby properly aerated.

Auxiliary stalks forwarding or gathering chains 45 and 46 are mounted for driving movement on the corn picker above the snapping rolls 32 and 33 to insure proper and simultaneous movement of the upper ends of the stalks along with the butt ends. After the ears are snapped they are dropped laterally onto a rearwardly extending conveyor 47 which, as best shown in Fig. 1, is adapted to move ears of corn rearwardly and upwardly to its discharge portion at 48 above a receiving hopper 49. A wagon elevator 50 is arranged and constructed to cooperate with the hopper 49 in emptying the hopper of its ears of corn and elevating the corn by means of flight members 51 on the elevator 50 for deposit in a rearwardly trailing wagon or the like.

The drive for the various elements composing this corn picker is obtained by means of power take-off on the tractor and the use of a plurality of sprockets and chains. Inasmuch as the drive for the various elements does not form a part of the present invention it is not believed necessary to more fully describe the details thereof.

Many details of construction may be varied through a wide range without departing from the principles disclosed herein and I therefore do not propose limiting the patent granted hereon otherwise than as necessitated by the appended claim.

What is claimed is:

A corn picker comprising a supporting structure, stalk gathering means mounted on the forward end of said supporting structure, stalk cut-off means mounted on said supporting structure at the rearward end of said gathering means, a rearwardly and upwardly inclined butt pan on said supporting structure, the forward end of which is positioned adjacent said stalk cut-off means, a stalk forwarding chain positioned parallel to and closely adjacent said butt pan, means urging the lower butt ends of said stalks against said stalk forwarding chain, upwardly and rearwardly inclined cooperative snapping rolls mounted for rotation on said supporting structure spaced directly above said butt pan, and the angle of inclination of the snapping rolls being greater than the angle of inclination of the butt pan.

REYNOLD BARKSTROM.

REFERENCES CITED

The following references are of record in the file of this patent:

UNITED STATES PATENTS

| Number | Name | Date |
| --- | --- | --- |
| 2,333,901 | Svenson | Nov. 9, 1943 |
| 2,385,193 | Burgin | Sept. 18, 1945 |